United States Patent [19]
Swett et al.

[11] Patent Number: 5,732,603
[45] Date of Patent: Mar. 31, 1998

[54] FLYWHEEL WITH EXPANSION-MATCHED, SELF-BALANCING HUB

[75] Inventors: Dwight W. Swett, Hawthorne; Daniel J. Gregoire, Thousand Oaks, both of Calif.

[73] Assignee: Hughes Electronics, Los Angeles, Calif.

[21] Appl. No.: 612,711

[22] Filed: Mar. 8, 1996

[51] Int. Cl.$^6$ .............................. G05G 1/00; F16F 15/10
[52] U.S. Cl. ........................................ 74/572; 74/574
[58] Field of Search ...................... 74/572–574; 156/60; 310/90.5, 114, 261

[56] References Cited

U.S. PATENT DOCUMENTS

| | | | |
|---|---|---|---|
| 3,602,066 | 8/1971 | Wetherbee | 74/572 |
| 4,058,024 | 11/1977 | Gordon | 310/74 |
| 4,343,203 | 8/1982 | Jacobson et al. | 74/572 |
| 4,821,599 | 4/1989 | Medlicott | 74/572 |
| 4,991,462 | 2/1991 | Breslich et al. | 74/573 R |
| 5,124,605 | 6/1992 | Bitterly et al. | 310/74 |
| 5,562,582 | 10/1996 | Malekmadani | 74/572 |
| 5,566,588 | 10/1996 | Bakholdin et al. | 74/572 |
| 5,586,471 | 12/1996 | Nardone et al. | 74/572 |

*Primary Examiner*—Vinh T. Luong
*Attorney, Agent, or Firm*—V. D. Duraiswamy; W. K. Denson-Low

[57] ABSTRACT

A flywheel hub includes an annular hoop and a pair of compliant diaphragms which are connected by the hoop. The diaphragms have apertures to receive a flywheel shaft and the hoop is sized to receive an annular rim. The diaphragms achieve their compliance principally with a serpentine, radial cross section. The hub is preferably realized with fiber and matrix composites. Because the compliant hub tends to match radial expansions of adjoining flywheel components, joint integrity between components is enhanced. In addition, the hub permits the rim to position its center of mass on the rotational axis to reduce rim vibrations. Axial spacing of the diaphragms provides moment stiffness to limit and control the rim deflection caused by, for example, gyroscopic precession forces.

15 Claims, 6 Drawing Sheets

| COMPONENT | PLY STRESS (psi) | MATRIX STRESS (psi) | LAMINATE STRENGTH (ksi) | LOAD CAPACITY RATIO |
|---|---|---|---|---|
| HUB 0/90 LAYUP OF IM7 FIBER | $\sigma_r = -8776.1$ $\sigma_\theta = 122947.3$ $F_{TW} = 0.29$ | $\sigma_{norm} = 1381.6$ $\tau_{int} = 6612.8$ | $X_T = 194$  $X_C = 103$ $Y_T = 194$  $Y_C = 103$ $S_{XY} = 14.5$ | 1.473 (PLY FAILURE) (121,345 RPM) |
| RIM 95% RIM WOUND OF IM7 FIBER | $\sigma_z = 906.5$ $\sigma_\theta = 203457.0$ $F_{TW} = 0.06$ | $\sigma_{norm} = 7845.7$ $\tau_{int} = 337.2$ | $X_T = 388$  $X_C = 206$ $Y_T = 19$   $Y_C = 206$ $S_{XY} = 14.5$ $Z_T = 10.2$  $Z_C = 20$ | 1.300 (MATRIX FAILURE) (114,021 RPM) |

FIG. 7

| CYCLIC LOAD SCENARIO | REQUIRED ENDURANCE RATIO | FATIGUE LIFE (CYCLES) |
|---|---|---|
| TURN SCENARIO: 0.15 RADIANS/SEC 95 N-M TORQUE | $S_e' = 0.27$ | $2.82 \times 10^{10}$ (4697 HR, 100KRPM) |
| RIM ECCENTRICITY 0.127 MILLIMETERS | $S_e' = 0.06$ | INFINITE |
| RIM TILT 0.001 RADIAN | $S_e' = 0.02$ | INFINITE |

FIG. 8

FLYWHEEL WITH EXPANSION-MATCHED, SELF-BALANCING HUB

This invention was made with Government support under Contract No. F29601-92-C-0124 awarded by the Department of the Air Force. The Government has certain rights in this invention.

BACKGROUND OF THE INVENTION

1. Field of the Invention

The present invention relates generally to energy-storage and vehicle-stabilization flywheels.

2. Description of the Related Art

Flywheels have a variety of potential applications which include use as energy-storage and power-source devices in space satellites and hybrid-electric, land vehicles and as momentum wheels for satellite stabilization. Many of these flywheel applications require greater energy storage capacity and higher energy density (the ratio of energy stored in a device to the device weight) than is currently available.

Because the kinetic energy of a rotating body is equal to $0.5\,I\omega^2$ (in which I is the body's moment of inertia and $\omega$ is the angular velocity), efforts to increase the stored energy and the energy density of flywheels have concentrated on increasing their angular velocity. However, angular velocity causes radial expansion in flywheel components and, because the component expansions are typically different, stress is placed on the component interfaces. In addition, flywheel imbalances (caused, for example, by component misalignment and eccentricity) emphasize potentially destructive resonances and place reaction loads on flywheel components, e.g., shaft bearings. As rotational velocity is increased, these loads also increase and ultimately cause failure of component interfaces, shaft bearings or other flywheel components.

Attempts to improve the integrity of component interfaces have typically taken the brute force approach of increasing the stiffness and/or robustness of the attachment mechanism, e.g., adding mechanical fasteners, increasing component cross sections and incorporating compression preloads.

In contrast, some flywheel concepts have included compliant structures. For example, U.S. Pat. No. 5,124,605 addresses the need for a rim and a hub to grow differentially in order to eliminate the transfer of outer radial stress to the hub axis. That is, because the inner and outer surfaces of the rim expand outward during high speed rotation, the hub must expand at least as rapidly. The Patent observes that this can be accomplished if the hub's modulus of elasticity is less than that of the rim. In a flywheel embodiment of the Patent, a plurality of tube assemblies are positioned to couple the rim and hub. However, the tube assemblies are precompressed or preloaded within the flywheel to maintain dynamic stability at high rotational velocity.

U.S. Pat. No. 4,821,599 couples a rim to a central portion which includes at least one substantially circular, dished member. The dished member is curved such that increasing rotational speed tends to elastically deform the dished member, thereby straightening the curve and increasing the diameter of the dished member. Preferably, the dished members include three integrally-formed, annular portions of which at least two are curved and positioned on each side of the third portion.

Although these dished members are intended to be sufficiently flexible in the radial direction to allow the diameter of the dished member to increase and remain in contact with the rim at operational speeds, the Patent teaches alternative assembly methods which preload the interface between the rim and the hub. In an exemplary process, the rim and the hub have a temperature difference of 20°–30° C. to facilitate the assembly. In addition, an axial load may be applied to a central hole of the dished members in order to prestress them. This latter preload is accomplished, in an embodiment, with a tapered sleeve which is driven up a tapered portion of the flywheel shaft. In another embodiment, reinforcing rings are positioned around the dished members adjacent to their central hole to assist in securing the flywheel to its shaft.

Flywheel structures which must include preloading (e.g., by means of assembly temperature differentials) and attachment mechanisms (e.g., retaining rings) have typically failed to increase angular velocities and/or energy densities sufficiently to make flywheels attractive in the most weight-sensitive applications.

SUMMARY OF THE INVENTION

The present invention is directed to a flywheel which is capable of storing large amounts of energy and achieving a high energy density (e.g., 130 watthours/kilogram).

This goal is achieved with the realization that high rotational velocities can be achieved with compliant hub elements because they tend to match radial expansions of adjoining flywheel components (i.e., they are "expansion matched"), permit repositioning of a rim's center of mass to accommodate flywheel imbalances (i.e., they are "self balancing") and reduce the frequencies of potentially destructive vibrational modes below the flywheel's operational velocity.

It is also realized that this goal can be best accomplished by avoiding stiff structures, attachment mechanisms and preloading processes. Finally, it is realized that any arrangement of compliant elements must also exhibit angular stability to limit and control forces, e.g., gyroscopic precession forces, which act about an axis that is orthogonal to the flywheel's rotational axis.

Accordingly, a high energy-density flywheel is obtained with a hub which includes an annular hoop and a pair of compliant, axially-spaced diaphragms. Each of the diaphragms forms a conic frustum with first and second ends, an annular spring and an annular disk which couples the annular spring and the conic frustum's second end. Each of the conic frustum first ends define an aperture and the apertures are coaxially arranged to receive a shaft. The annular hoop connects the annular springs and is sized to receive an annular rim.

In its cross section, the annular spring has first and second axially-directed segments which enhance the radial compliance of the spring. The compliance of the annular spring facilitates the maintenance of contact at a hub-to-rim interface.

The restoring force of the spring is coupled through the annular disk to the conic frustum's second end. In response, the conic frustum's first end rotates inward against the shaft. This action in combination with low radial expansion loads facilitates the maintenance of contact at a hub-to-shaft interface using a simple bonded joint of a conventional adhesive.

In features of the invention, the radial compliance of the diaphragms allows the hub to match the radial expansions of adjoining flywheel components, reduces stress coupling between flywheel components, and facilitates positioning of the rim's center of mass on the shaft's rotational axis. The axial spacing of the diaphragms provides angular stability to limit rim deflection under gyroscoptic loading.

Hub embodiments may be formed with various materials, e.g., metals and composite materials such as a carbon fiber and epoxy matrix composite.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
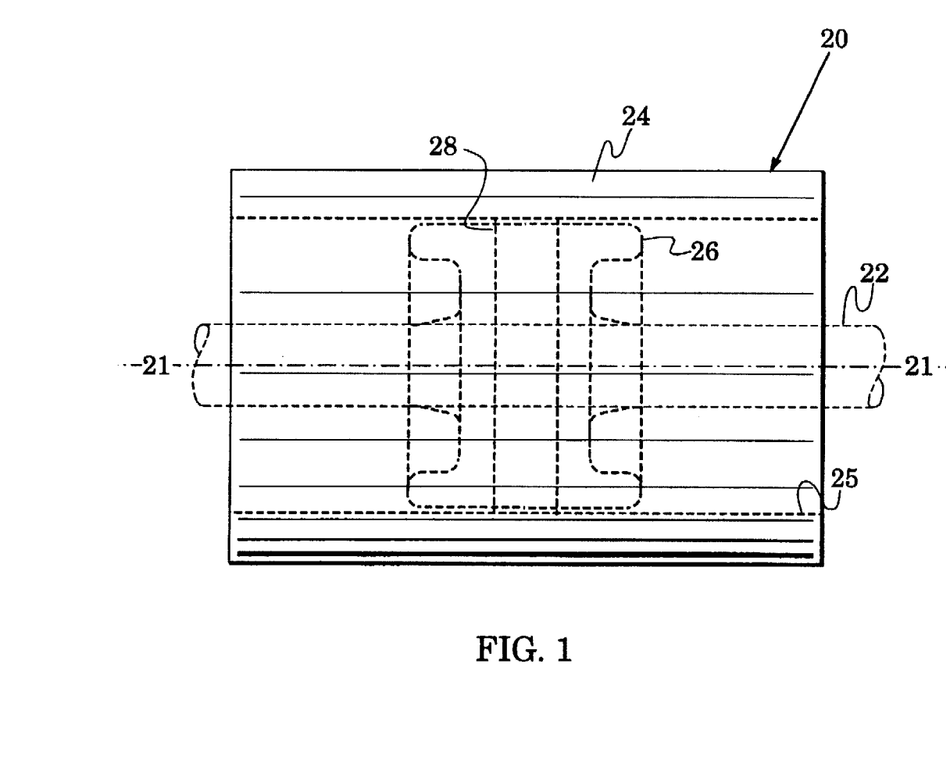
FIG. 1 is a side view of a flywheel in accordance with the present invention.
Figure 2:
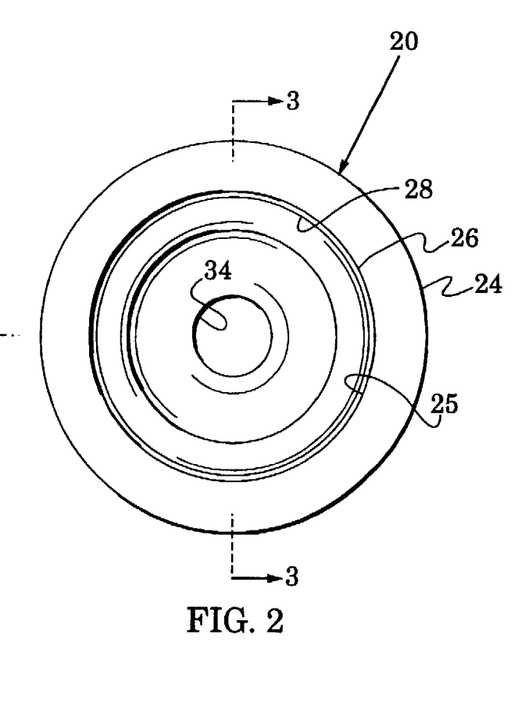
FIG. 2 is an end view of the flywheel of FIG. 1.

FIGS. 1 and 2 illustrate a flywheel 20 for rotation about the axis 21 of a shaft 22. The flywheel 20 includes a rim 24 having an interior surface 25 and a hub 26 which connects the rim 24 to the shaft 22. The hub 26 is configured with structures that provide radial compliance and axial stability.

Figure 3:
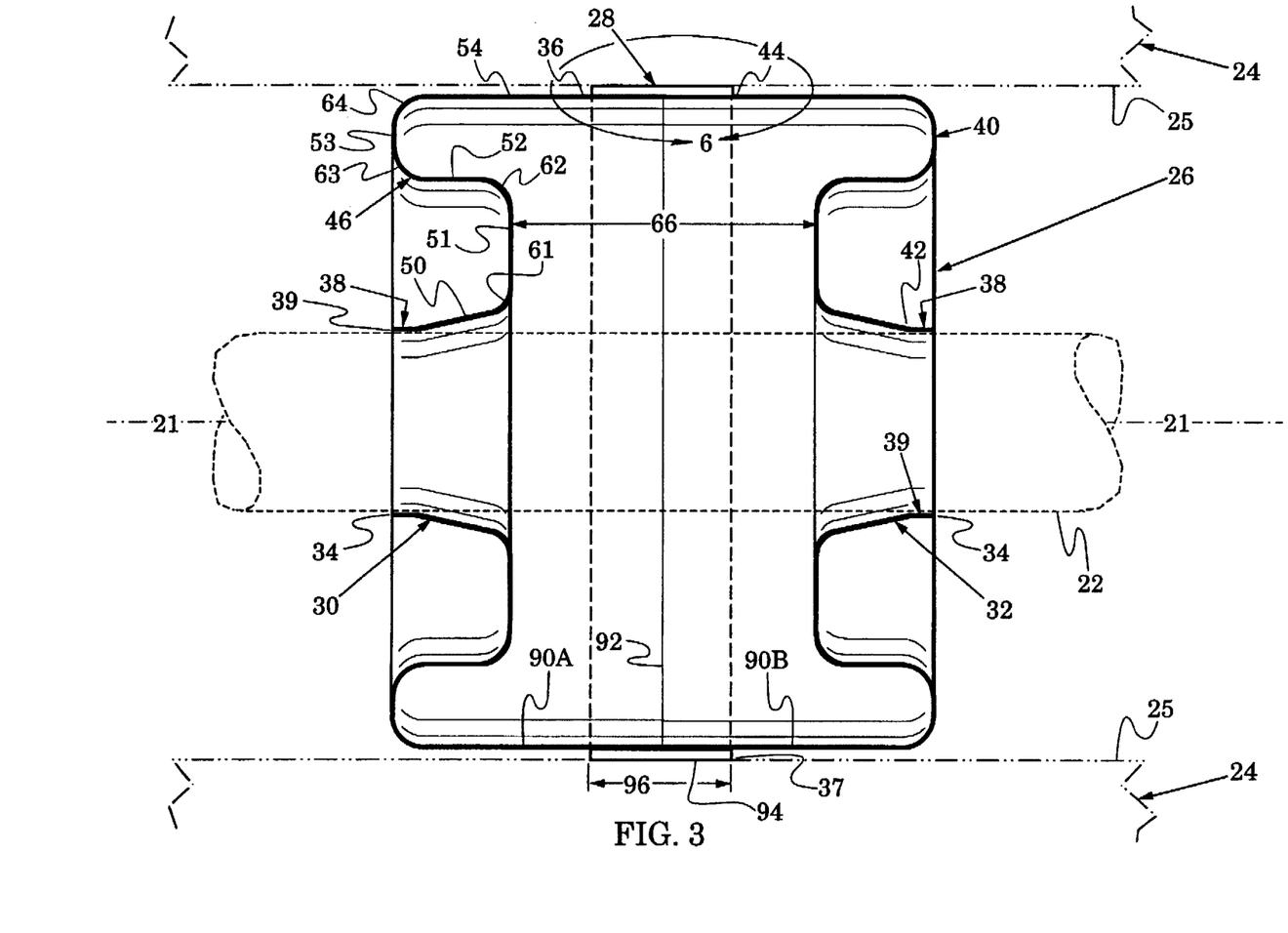
FIG. 3 is an enlarged, sectional view along the plane 3—3 of FIG. 2.
Figure 4:
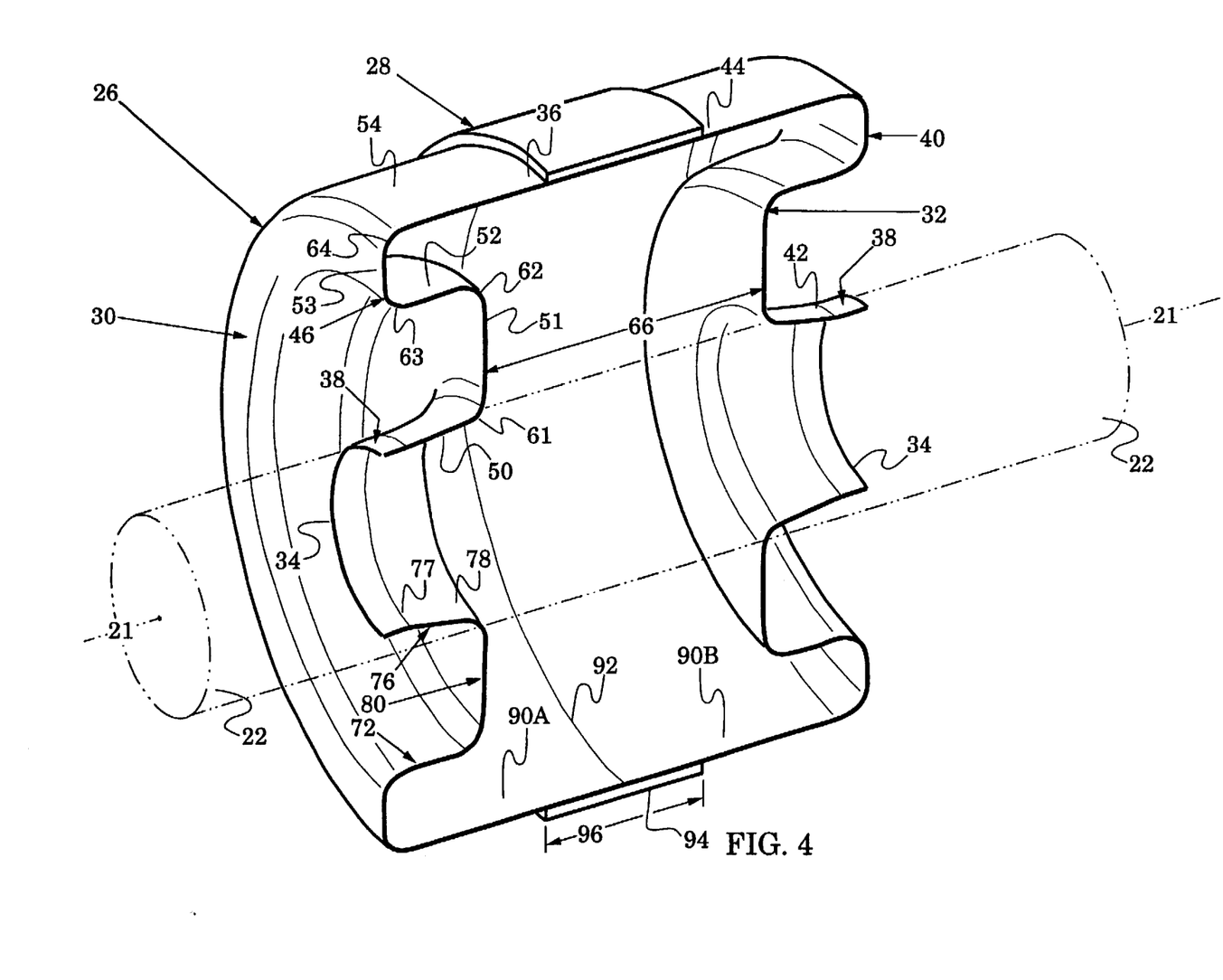
FIG. 4 is an enlarged, perspective view along the plane 3—3 of FIG. 2 which shows a hub of the flywheel of FIGS. 1 and 2.

In particular, FIGS. 3 and 4 show that the hub 26 structure includes an annular hoop 28 and a pair of compliant diaphragms 30 and 32. Each of the diaphragms forms an aperture 34 and terminates radially in a perimeter 36. The apertures 34 are coaxially arranged to receive the shaft 22 and the perimeters 36 are connected by the hoop 28. The hoop 28 is sized for joining to the interior surface 25 of the rim 24 along a rim-to-hub interface 37.

To facilitate bonding of the hub 26 to the shaft 22, each of the diaphragms 30 and 32 preferably has a cylindrical portion 38 which adjoins the aperture 34. The cylindrical portion 38 facilitates the formation of a hub-to-shaft interface 39. A second, annular portion 40 of the diaphragms has an inner margin 42 which adjoins the cylindrical portion 38 and an outer margin 44 which defines the perimeter 36.

The annular portion 40 has a radial cross section 46 which is especially configured to enhance the compliance of the hub 26. In the embodiment detailed in FIGS. 3 and 4, the radial cross section 46 has an radially-inclined segment 50 which adjoins the inner margin 42, a radially-directed segment 51, an axially-directed segment 52, a radially-directed segment 53 and an axially-directed segment 54 which adjoins the outer margin 44. Segments 50 and 51 are connected by a curved segment 61, segments 51 and 52 are connected by a curved segment 62, segments 52 and 53 are connected by a curved segment 63 and segments 53 and 54 are connected by a curved segment 64.

The annular hoop 28 causes the diaphragms 30 and 32 to be axially spaced, e.g., by the space 66 between diaphragm segments 51. The flywheel components are joined at the rim-to-hub interface 37 and hub-to-shaft interface 39 by conventional high-strength bonding materials.

In operation, the hub 26 is a torque transmission mechanism between the shaft 22 and the rim 24. Flywheel rotation typically causes the flywheel components to expand radially with different expansion rates. The shape of the radial cross section 46 provides a radial compliance which enhances the joint integrity at the rim-to-hub interface 37 and hub-to-shaft interface 39 because the hub's compliance allows it to match the radial expansions of the adjoining flywheel components at these interfaces. That is, the compliant hub 26 is substantially expansion matched to its adjoining components.

Because the expansion differences across the rim-to-hub interface 37 and hub-to-shaft interface 39 are reduced, the need for conventional load-carrying interface structures and processes, e.g., preloaded tube assemblies, reinforcing rings, and assembly preloads, can be replaced with simple bonded joints.

When the flywheel 20 approaches its critical resonance (substantially below the operational frequency range), the compliance of the hub 26 also allows the rim 24 to position its center of mass on the axis 21 of the shaft 22. That is, the compliant hub 26 facilitates self balancing of the flywheel 20. This reduces rim vibration which, in turn, reduces reaction loadings that cause component deterioration, e.g., shaft bearing wear and hub fatigue. The importance of this self-balancing feature of the invention is emphasized by the fact that a one gram imbalance on a 100 krpm, 10 centimeter radius flywheel results in a force of ~1000 newtons on shaft bearings. Without the self balancing of the compliant hub 26, mass imbalance can excite vibrational modes to destructive amplitudes.

In addition, the compliant structure of the radial cross section 46 reduces stress coupling between the flywheel components. This coupling reduction permits the use of simplified stress analysis and design methods, i.e., the rim and hub analysis can be decoupled to permit independent component design.

The axial spacing, e.g., the space 66 in FIGS. 2 and 3, of the diaphragms 30 and 32 provides moment stiffness to limit and control the deflection of the rim 24 when it is torqued (by gyroscopic action, for example) about an axis that is orthogonal to the shaft axis 21.

Figure 5A:
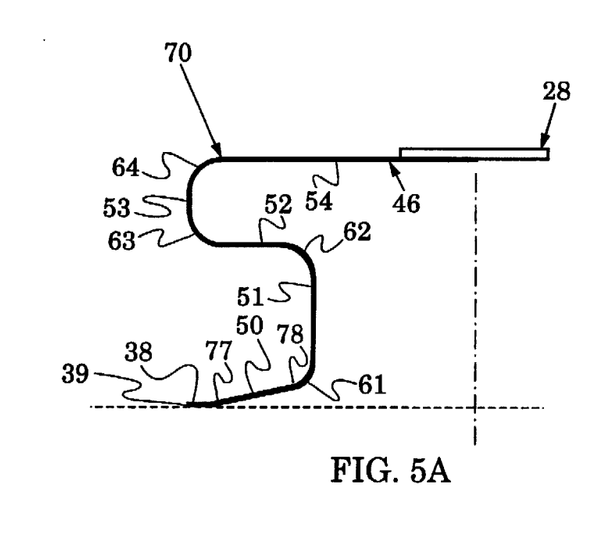
FIG. 5A shows a radial cross section of a diaphragm in the sectional view of FIG. 3.
Figure 5B:
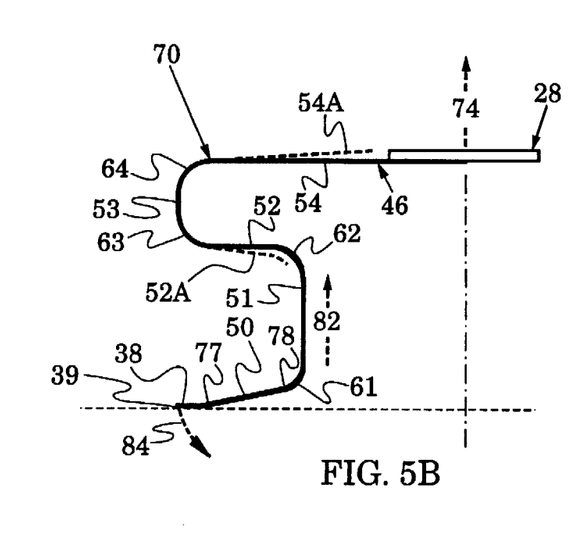
FIG. 5B is a view similar to FIG. 5A, which illustrates the operation of the radial cross section of FIG. 5A.

To facilitate a detailed description of the operation of the hub 26, one of the cross sections 46, an adjoining cylindrical portion 38 and an adjoining cross section of the hoop 28 are repeated in FIGS. 5A and 5B. FIG. 5A shows a quiescent condition and FIG. 5B shows the response of the hub at operational velocities. The U-shape of the axially-directed segments 52 and 54 and their connecting structure (segments 53, 63 and 64) form a spring structure 70 which, in the round, forms an annular spring (referenced as 72 in the lower portion of FIG. 4).

The U-shaped, annular spring 72 can compliantly flex to facilitate radial expansion of the hoop 28 at high angular velocities. This radial expansion of the hoop is indicated in FIG. 5B by the broken expansion arrow 74. The segments 52 and 54 of the spring structure 70 easily accommodate this radial expansion by rotating outward to positions which are indicated by broken lines 52A and 54A. Thus, the compliance of the spring structure 70 (i.e., the annular spring 72 of FIG. 4) facilitates the maintenance of contact at the hub-to-rim interface (37 at the bottom of FIG. 3).

In the round, the radially-inclined segment 50 forms a conic frustum (referenced as 76 in the lower portion of FIG. 4) which has a first diameter at the junction of its first end 77 and the cylindrical portion 38 and a larger, second diameter at the junction of its second end 78 and the segment 61. In the round, the segment 51 forms an annular, radially-directed disk (referenced as 80 in the lower portion of FIG. 4). The conic frustum 76 is coupled to the annular spring 72 by the disk 80.

As the spring 72 deforms, its restoring force is coupled through the disk 80 to the end 78 of the conic frustum 76 as indicated by the broken coupling arrow 82 in FIG. 5B. In response to outward radial forces on the second end 78 of the conic frustum 76, the first end 77 rotates inward as indicated by the broken pressure arc 84 in FIG. 5B. Thus, radial pressure is exerted upon the cylindrical portion 38. This pressure facilitates the maintenance of contact at the hub-to-shaft interface (34 in FIG. 3). Note that, in the foregoing operational description, the extent of movement of portions of the hub 26 is exaggerated for clarity of illustration.

The teachings of the invention can be realized with other hub embodiments. For example, the axially-directed segments 52 and 54 of the spring structure 70 in FIGS. 5A and 5B (i.e., the annular spring of FIG. 4) can be connected by a single curved segment (in place of the segments 53, 63 and 64). The radially-directed segment 51 (i.e., the annular disk 80 of FIG. 4) can be replaced by a curved segment or by a segment which is not orthogonal with the axis 21.

The hub embodiment 26 of FIGS. 3 and 4 is especially configured to facilitate fabrication of the hub 26 and assembly of the flywheel 20. As indicated in the lower portion of these figures, the hub is formed of two identical parts 90A and 90B which are bonded at an annular partition line 92. A doubler 94 is centered over the partition line 92 and extends axially over each part 90A and 90B. The doubler 94 provides an annular surface for the rim-to-hub interface 37 and allows space for flexure clearance.

In the embodiment of FIGS. 3 and 4, the hoop 28 consists of the doubler 94 and those portions of the parts 90A and 90B which are overlapped by the doubler 94. Thus, the axial extent 96 of the hoop 28 is identical with that of the doubler 94. In general, the axial extent of the hoop is that portion of the hub 26 that is joined at the rim-to-hub interface 37 to the rim 24. It is the annular portion of the hub which is between the perimeters 36 of the axially-spaced diaphragms 30 and 32.

Figure 6:
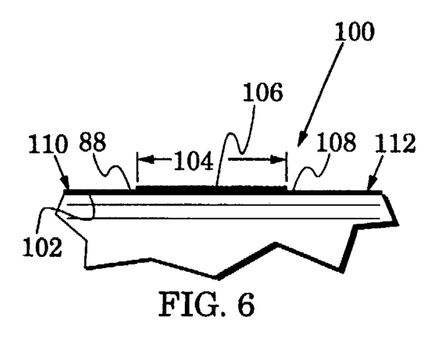
FIG. 6 illustrates another embodiment of the area within the curved line 6 of FIG. 3.

FIG. 6 illustrates another hub embodiment 100 in which an annular wall 102 is thickened over a radial extent 104 to form a hoop 106. The perimeters 108 of the diaphragms 110 and 112 adjoin the hoop 106. Although other hub embodiments can be formed without it, the thickening of the hoop portion of the wall 102 facilitates the application of bonding materials between the hoop 28 and the rim 24.

Although the compliant rim and hub embodiments illustrated in FIGS. 1–6 can be realized with almost any structural material (e.g., metals such as titanium and high-strength steel) fiber and matrix composites are especially suitable because of their high strength-to-weight ratios. Because flywheel embodiments are preferably carried within evacuated housings to reduce frictional drag, a selected composite should also have low outgassing characteristics.

Graphite fiber and cyanate-ester matrix composites have particularly good strength and outgassing specifications. Carbon fiber and epoxy matrix composites have similar strength-to-weight ratios but exhibit somewhat greater out-gassing. The shaft 22 is preferably formed of a high-strength metal, e.g., steel, titanium or aluminum.

A stress analysis study was completed for a prototype design of the flywheel 20 of FIGS. 1–4. In this prototype design, the diameter of the shaft 22 was ~38.9 millimeters, the axial space 66 between cross section segments 51 was ~63.5 millimeters and the spacing from the shaft 22 to the rim-to-hub interface 37 was ~47 millimeters.

In the design, the hub 26 is a 6 ply laminate of graphite fiber with preimpregnated matrix which has a combined wall thickness of ~0.8 millimeter. The fibers were arranged with an alternating radial and circumferential orientation (0/90 layup). The cylindrical rim 24 was ~30 millimeters thick and ~150 millimeters in length. It was wound circumferentially (circumferential orientation was at least 95%) with graphite fiber. The doubler 94 was assumed to be 6 plies wound circumferentially to enhance axial expansions with the circumferentially wound rim 24. The stress analysis assumed a rotational velocity of 100 krpm and an IM7 composite. The analysis results are summarized in table 120 of FIG. 7. The table shows the radial and hoop stresses ($\sigma_r$ and $\sigma_\theta$) for the plies of the hub 26. For the matrix of the hub, the "peel" stress ($\sigma_{norm}$) and the interlaminar shear stress ($\tau_{int}$) between plies is shown.

Figure 7:
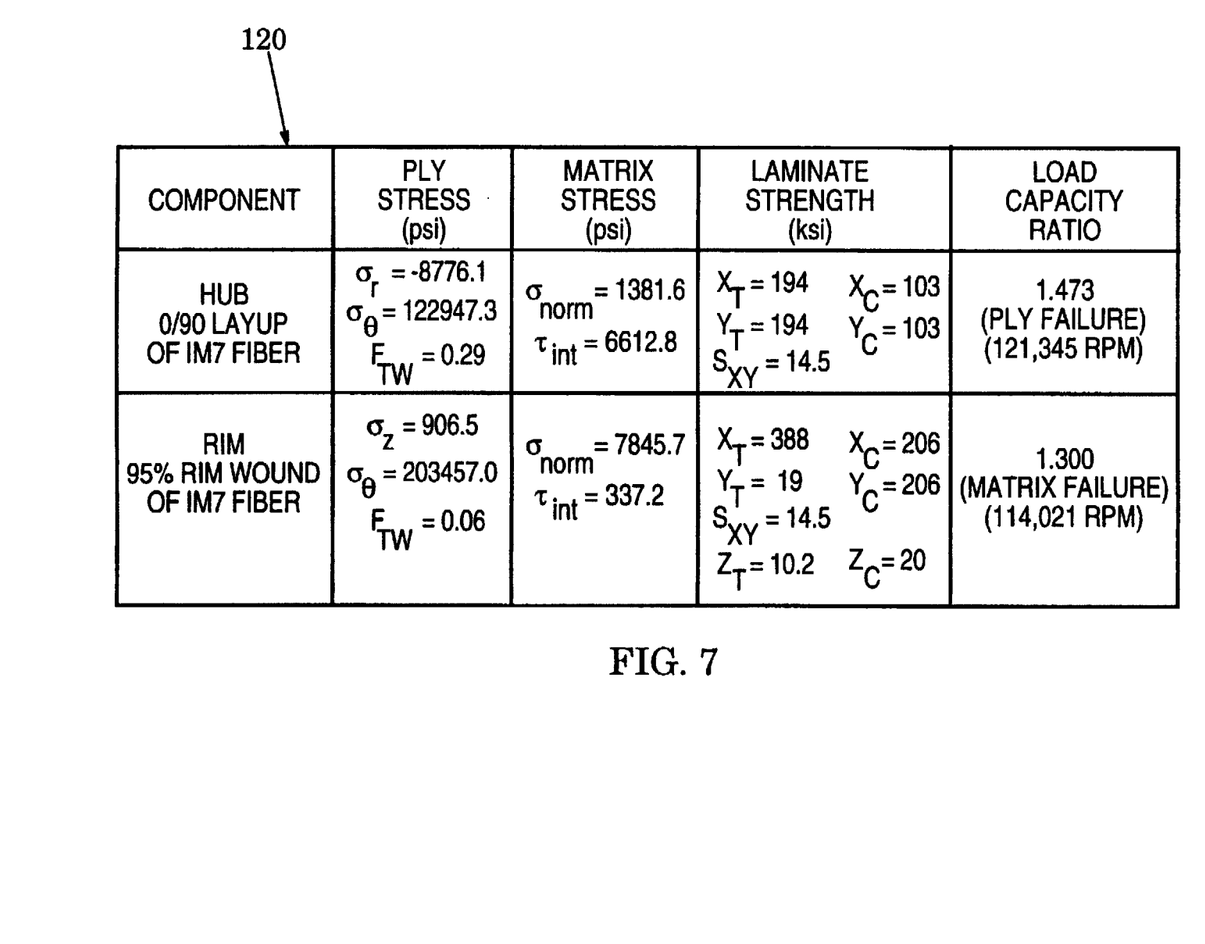
FIG. 7 is a table which compares calculated stresses and strengths in the flywheel of FIGS. 1 and 2.

These stresses are compared to the strengths of the hub laminate which were calculated along orthogonal coordinates in which the X and Y axes are in the plane of the ply (X is circumferential and Y is radial) and the Z axis is normal to the plane of the ply. The subscripts C and T refer to compression and tension. In addition, the shear strength in the plane of the laminate ($S_{xy}$) is shown. Calculated stresses are in pounds per square inch (psi) and calculated laminate strengths are in thousands of pounds per square inch (ksi). Pounds per square inch can be converted to megapascals by multiplying by ~0.0069.

An exemplary comparison of calculated stresses and strengths is that the hoop stress in the hub ply ($\sigma_{T4}$) was ~123 ksi and the hoop strength of the ply ($X_T$) was 194 ksi. In a Tsai-Wu failure index ($F_{TW}$), an index of 1.0 indicates a zero margin of safety. In contrast, the index for the hub was calculated at 0.29. The analysis of the hub is summarized in a load capacity ratio which is a ratio of load capacity to that load calculated for a velocity of 100 krpm. This ratio of 1.473 indicates that no hub failure is expected for flywheel velocities less than ~121 krpm. The expected failure would be in the ply.

Similar calculated stresses and strengths are shown in the table 120 for the rim 24. An exemplary comparison between calculated stresses and strengths is that the hoop stress in the rim ply ($\sigma_\theta$) was ~203 ksi and the hoop strength of the ply ($X_T$) was 388 ksi. The Tsai-Wu failure index ($F_{TW}$) was calculated at 0.06 and the load capacity ratio was 1.3 which indicated that no rim failure is expected for flywheel velocities less than ~114 krpm. The expected failure would be in the matrix due to radial expansion loads.

The calculated stress at the hub-to-shaft interface (39 in FIGS. 2 and 3) was 314 psi at the edges of the interface and 619 psi at the center of the interface. The calculated stress at the rim-to-hub interface (37 in FIGS. 2 and 3) was 278 psi at the edges of the interface and 1076 psi at the center of the interface. These are safe stress levels as typical bonding materials have a strength of ~3000 psi.

The stress analysis also calculated the expected cycle life under three loading scenarios and using a fatigue relationship indicated from various graphite epoxy laminate data sources. The results of this analysis is shown in table 122 of FIG. 8. In the first scenario, the flywheel system is rotated at 0.15 radians/second about an axis which is orthogonal to the axis 21 of the shaft 22. This rotation induces 95 newton meters of torque due to gyroscopic precession. During the time duration of this load, any selected location of the hub would be cycled through this stress state once for each rotation of the flywheel. In an application of the invention, this rotation can be induced by motion of a vehicle (e.g., a hybrid-electric automobile) which is carrying the flywheel, although such rotation would typically be reduced by the mounting mechanism, e.g., gimbals, of the flywheel.

Figure 8:
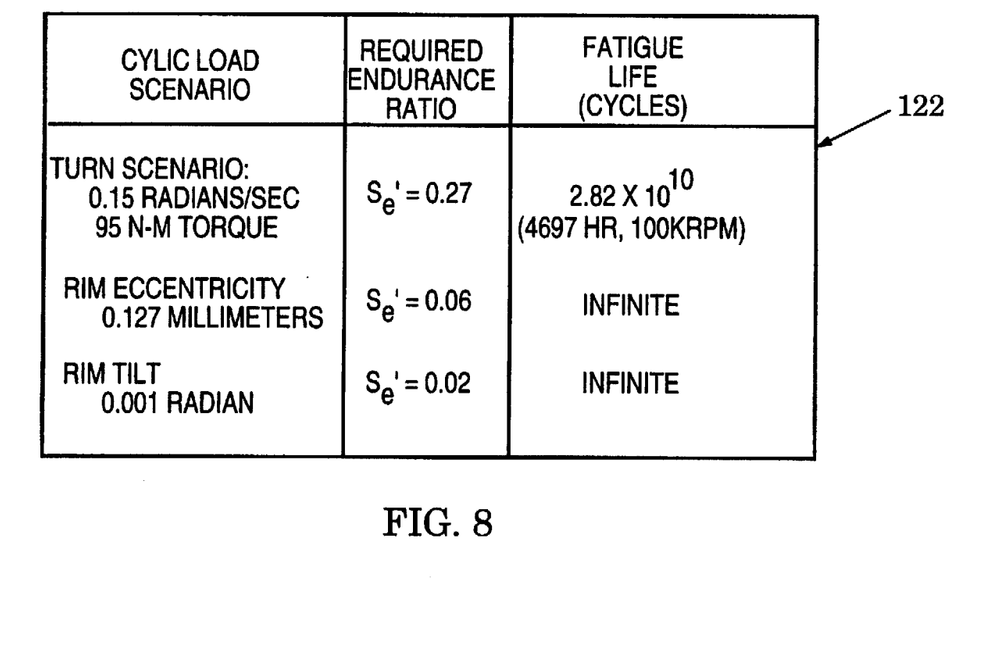
FIG. 8 is a table which illustrates calculated fatigue life in the flywheel of FIGS. 1 and 2.

A required endurance ratio $S_e$, (the ratio of completely reversed peak stress to static strength) and a fatigue life were calculated for this loading scenario. The analysis indicated a fatigue life for turning speeds of 0.15 radians/second on the order of 4700 hours with the assumption of a flywheel velocity of 100 krpm. Because this loading is expected to occur intermittently, this fatigue life indicates a service life of several years.

A second cyclic loading scenario assumed that the rim 24 has an eccentricity of 0.127 millimeters and a third cyclic loading scenario assumed that the rim 24 was tilted by 0.001 radians from the axis 21 of the shaft 22. The calculated fatigue life at 100 krpm of these two scenarios was substantially infinite.

When any flywheel is accelerated to an operational speed it must pass through several vibrational resonances. Resonance modes that are "whirl" excitable are driven by imbalance or misalignment of the rotating mass. Whiff modes are particularly dangerous because they can cause structural damage if the loading and time duration are sufficiently large.

In system operation, the flywheel 20 is preferably rotated supercritical, i.e., its operational speed is higher than the critical resonant speeds (the speeds at which whim modes are excited). As the speed of the flywheel 20 approaches one of the vibration modes, the vibration amplitude peaks at the critical speed and then decreases to a finite level as the flywheel speed is increased further. This finite level is minimized by the compliant quality of the hub 26 which flexes to let the rim 24 center itself and rotate about its center of mass. Thus, the hub 26 acts as a self-balancing device for the rim 24 at supercritical speeds.

The expansion-matched, self-balancing hub embodiments of FIGS. 1–6C provide a radial compliance which enhances the joint integrity at the rim-to-hub interface 37 and hub-to-shaft interface 39. They allow the rim 24 to position its center of mass on the axis 21 of the shaft 22, reduce the coupling of stress between flywheel components and lower potentially destructive whirl resonances below the flywheel's operational velocity. In addition, the radial spacing of the diaphragms 30 and 32 reduces deflection of the rim 24 when it is subjected to vibrational and gyroscopic forces.

Prototype flywheels which are similar to the analyzed design, have been fabricated and testing of these prototypes is proceeding. Test results have already verified some of the flywheel attributes (e.g., rim center-of-mass balancing and limited deflection of the rim under gyroscopic precession forces) which were indicated by the prototype analysis. All of the completed stress analysis and prototype testing indicates that hub embodiments taught by the present invention facilitate the attainment of high angular flywheel speeds, e.g., 100 krpm, high energy storage, e.g., >1 kilowatthours and high energy density, e.g., ~130 watthours/kilogram. In contrast, a typical energy density of a state-of-the-art battery is ~30 watthours/kilogram.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A flywheel for rotation about a flywheel axis, comprising:

an annular rim;

an annular hoop joined to said rim; and first and second axially-spaced diaphragms, each of said diaphragms forming a conic frustum with first and second ends, an annular spring and an annular disk which couples said annular spring and said conic frustum second end, each of said conic frustum first ends defining an aperture;

wherein said annular hoop connects said annular springs and said apertures are coaxially arranged.

2. A flywheel for rotation about a flywheel axis, comprising:

an annular rim;

an annular hoop joined to said rim; and first and second axially-spaced diaphragms, each forming a conic frustum with first and second ends, an annular spring and an annular disk which couples said annular spring and said conic frustum second end, and each of said conic frustum first ends defining an aperture;

wherein said annular spring forms a U-shaped, radial cross section; and wherein said annular hoop connects said annular springs and said apertures are coaxially arranged.

3. The flywheel of claim 1, wherein said annular spring has a radial cross section which includes first and second axially-directed segments.

4. The flywheel of claim 1, wherein each of said diaphragms includes a cylindrical portion which is coupled to said conic frustum first end.

5. The flywheel of claim 1, wherein said annular disk is radially directed.

6. A flywheel hub for rotation about a hub axis, comprising:

an annular hoop; and first and second axially-spaced diaphragms, each of said diaphragms forming a conic frustum with first and second ends, an annular spring and an annular disk which couples said annular spring and said conic frustum second end, each of said conic frustum first ends defining an aperture;

wherein said annular hoop connects said annular springs and said apertures are coaxially arranged.

7. The flywheel hub of claim 6, wherein said annular spring has a radial cross section which includes first and second axially-directed segments.

8. The flywheel hub of claim 6, wherein each of said diaphragms includes a cylindrical portion which is coupled to said conic frustum first end.

9. The flywheel hub of claim 6, wherein said annular disk is radially directed.

10. A flywheel hub for rotation about a hub axis, comprising:

an annular hoop; and first and second axially-spaced diaphragms, each forming a conic frustum with first and second ends, an annular spring and an annular disk which couples said annular spring and said conic frustum second end, and each of said conic frustum first ends defining an aperture;

wherein said annular spring forms a U-shaped, radial cross section; and wherein said annular hoop connects said annular springs and said apertures are coaxially arranged.

11. A flywheel hub for rotation about a hub axis, comprising:
   first and second axially-spaced diaphragms, each of said diaphragms having:
   a) a conic frustum with first and second ends, said first end defining an aperture;
   b) an annular spring with first and second ends; and
   c) an annular disk which couples said annular spring first end and said conic frustum second end;
   wherein said said annular spring second ends are joined and said apertures are coaxially arranged.

12. The flywheel hub of claim 11, wherein said annular spring has a radial cross section which includes first and second axially-directed segments.

13. The flywheel hub of claim 11, wherein each of said diaphragms includes a cylindrical portion which is coupled to said conic frustum first end.

14. The flywheel hub of claim 11, wherein said annular disk is radially directed.

15. A flywheel hub for rotation about a hub axis, comprising:
   first and second axially-spaced diaphragms, each of said diaphragms having:
   a) a conic frustum with first and second ends, said first end defining an aperture;
   b) an annular spring with first and second ends wherein said annular spring forms a U-shaped, radial cross section; and
   c) an annular disk which couples said annular spring first end and said conic frustum second end;
   wherein said annular spring second ends are joined and said apertures are coaxially arranged.

* * * * *